(12) United States Patent
Beisel et al.

(10) Patent No.: US 9,855,574 B2
(45) Date of Patent: Jan. 2, 2018

(54) SUPPLY DEVICE FOR VISCOUS MEDIA

(71) Applicant: SKF Lubrication Systems Germany GmbH, Walldorf (DE)

(72) Inventors: Daniel Beisel, Kronau (DE); Juergen Kreutzkaemper, Waibstadt-Daisbach (DE); Andreas Schoenfeld, Sankt Leon-Rot (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 50 days.

(21) Appl. No.: 15/135,143

(22) Filed: Apr. 21, 2016

(65) Prior Publication Data

US 2017/0021374 A1 Jan. 26, 2017

(30) Foreign Application Priority Data

Apr. 23, 2015 (DE) .......................... 10 2015 207 469

(51) Int. Cl.
| | |
|---|---|
| *F16N 13/22* | (2006.01) |
| *B05B 9/047* | (2006.01) |
| *F16N 11/10* | (2006.01) |
| *F16N 13/06* | (2006.01) |

(52) U.S. Cl.
CPC .............. *B05B 9/047* (2013.01); *F16N 11/10* (2013.01); *F16N 2013/063* (2013.01)

(58) Field of Classification Search
CPC ..... B05B 9/047; F16N 11/10; F16N 2013/063
See application file for complete search history.

(56) References Cited

U.S. PATENT DOCUMENTS

| | | | | |
|---|---|---|---|---|
| 2,268,592 | A | * | 1/1942 | Hothersall .............. F16N 37/02 137/533 |
| 4,134,523 | A | * | 1/1979 | Hansen ............. B05C 17/00579 138/42 |
| 4,817,829 | A | * | 4/1989 | Fuchs ................. B05B 11/0051 141/27 |

(Continued)

OTHER PUBLICATIONS

Saas-Fee: mb Zentralschmiertechnik. Schweiz, 2014, 22.—Firmenschrift. http://mg-zentralschmiertechnik.ch/media/.

(Continued)

*Primary Examiner* — Nicolas A Arnett
(74) *Attorney, Agent, or Firm* — 2SPL Patentanwaelte PartG mbB; Mani Arabi

(57) ABSTRACT

Disclosed is a supply device for supplying a consumer with a viscous medium, in particular a lubricant supply device, including at least a reservoir for the viscous medium including a follower piston which includes a ring seal at its circumferential edges and is supported on the viscous medium and which separates the reservoir into a space supplied with a viscous medium and an air space, and a feed pump for feeding the viscous medium from the reservoir to a medium outlet, such that further in the reservoir at least one opening is provided which serves to receive a ventilation apparatus via which the reservoir is in air-exchanging contact with the exterior surroundings, such that the opening is arranged in the reservoir such that in a determined filling state of the reservoir the ring seal at least partially overrides the opening so that the space supplied with a viscous medium is in fluidic connection with the opening.

9 Claims, 2 Drawing Sheets

(56) References Cited

U.S. PATENT DOCUMENTS

Figure 1:
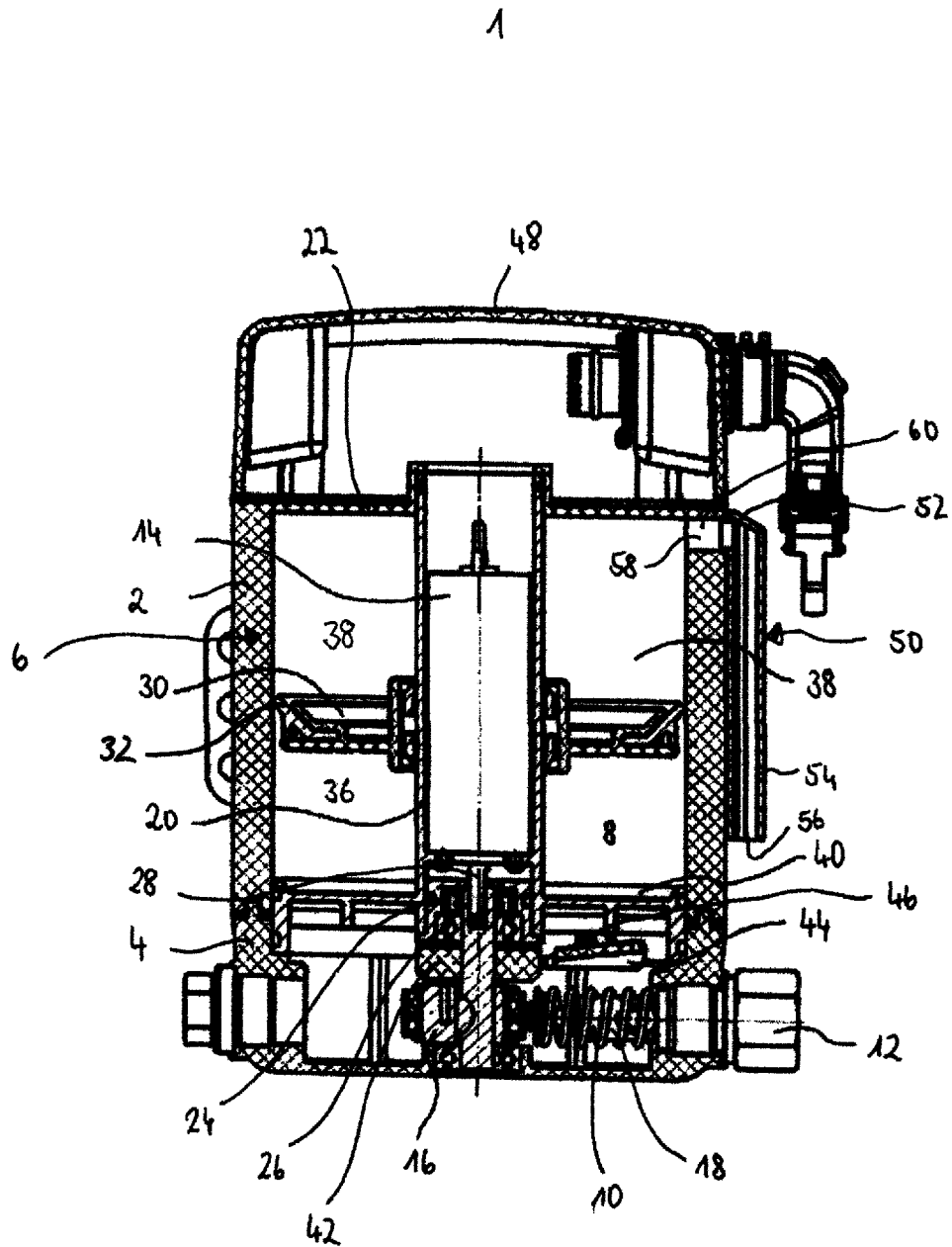

| | | | | |
|---|---|---|---|---|
| 4,854,484 A * | 8/1989 | Gentile | ............... | B05B 11/3001 |
| | | | | 222/256 |
| 5,524,680 A * | 6/1996 | de Laforcade | ...... | B05B 11/0037 |
| | | | | 141/113 |
| 6,834,689 B1 * | 12/2004 | Peters | .................. | B65D 88/121 |
| | | | | 141/27 |
| 8,544,610 B2 * | 10/2013 | Paluncic | .................... | F16N 7/38 |
| | | | | 184/26 |
| 9,004,228 B2 * | 4/2015 | Hildenbrand | ........... | F16N 11/08 |
| | | | | 184/26 |
| 2008/0060879 A1 * | 3/2008 | Orlitzky | ..................... | B01J 7/02 |
| | | | | 184/39 |
| 2011/0005866 A1 * | 1/2011 | Paluncic | .................... | F16N 7/38 |
| | | | | 184/26 |
| 2012/0103465 A1 * | 5/2012 | Paluncic | ............ | F01M 11/0458 |
| | | | | 141/325 |
| 2016/0186928 A1 * | 6/2016 | Holman | .................. | F04B 17/03 |
| | | | | 184/6 |
| 2016/0312777 A1 * | 10/2016 | Kreutzkaemper | ...... | F04B 17/03 |

OTHER PUBLICATIONS

Baier+Köppel: Elektropumpe EP-1. Pegnitz, 202.—Firmenschrift.
Centralne smarowanie: Pompa Pico. Polen, 2012—Firmenschrift.

* cited by examiner

SUPPLY DEVICE FOR VISCOUS MEDIA

The present invention relates to a supply device for viscous media, in particular to a lubricant supply device according to the subject matter of patent claim 1, and to a reservoir and a ventilation apparatus for such a device.

From the prior art supply devices for supplying a consumer with a viscous medium are known, in particular lubricant supply devices comprising a reservoir for receiving the viscous medium and a feed pump by means of which the viscous medium may be fed from the reservoir to a medium outlet. Here, the viscous medium is sucked into the direction of the feed pump so that the level of the filling agent of the viscous medium in the reservoir decreases. In order not to generate negative pressure in the reservoir due to the sucked off viscous medium which may complicate the drawing process, conventionally a ventilation apparatus is integrally formed at the reservoir via which air may flow into the reservoir and thus level out the negative pressure resulting from suction.

It is disadvantageous with known supply devices, however, that when filling the reservoir the viscous medium may easily enter the ventilation apparatus and contaminate the same. Due to these contaminations on the one hand hygiene problems result and on the other hand the functioning of the ventilation apparatus may be impaired as it is no more possible to supply sufficient air into the reservoir. If the ventilation apparatus is impaired with respect to its functioning or even completely defective, the reservoir or even the complete supply device has to be exchanged.

A further problem is that with supply devices in which the viscous medium is supplied by a follower piston in order to move the same in the direction of the feed pump, air bubbles result below the follower piston when filling the reservoir which impair a maximum filling of the container. Apart from that, via the enclosed air bubbles air may enter the feed pump which ought to be prevented in order to prevent a damage of the feed pump by air intake.

It is thus the object of the present invention to provide a supply device, in particular a lubricant supply device improving the above-mentioned disadvantages of the prior art.

This object is solved by a supply device according to patent claim 1.

In the following, a supply device for supplying a consumer with a viscous medium, in particular a lubricant supply device, is introduced including a reservoir for the viscous medium and a feed pump for feeding the viscous medium from the reservoir to a medium outlet. In the reservoir a follower piston is arranged which comprises a ring seal at its circumferential edges and is on the viscous medium, whereby the reservoir is divided into a space supplied with a viscous medium and an air space. Further, at least one opening is provided at the reservoir which is configured to receive a ventilation apparatus via which in turn the reservoir is in air-exchanging contact with the exterior surroundings.

To prevent air inclusions from resulting in the space below the follower piston supplied with a viscous medium, the opening in the reservoir is arranged such that in case of a determined filling state, in particular in case of maximum filling, of the reservoir the ring seal at least partially overruns the opening, so that the space supplied with a viscous medium is in fluidic connection with the opening. This way, air which is enclosed below the follower piston during filling may escape through the opening so that the follower piston is supported directly on the viscous medium without air inclusions. With the supply devices known from the prior art, the ventilation element is arranged in and/or at a lid which closes the reservoir. Here, the follower piston always remains below the lid so that an air outlet of air enclosed below the follower piston is not possible.

As in case of a fluidic connection between the space supplied with viscous medium and the opening not only air but also viscous medium may exit through the opening, it is further preferable for the ventilation apparatus to be detachably received in the opening and thus detachably connected to the reservoir. By this, both strict hygiene requirements may be met and also continuous ventilation may be guaranteed without the complete reservoir having to be exchanged in case of a failure of the ventilation apparatus. Consequently, the ventilation apparatus may be detached from the container, cleaned or exchanged as required or in regular intervals. It may thus be prevented that a cost-intensive exchange of the complete supply device has to be undertaken, for example, when lubricant which entered the ventilation apparatus during filling the reservoir hardens over time and impairs the ventilation apparatus. If lubricant has entered the ventilation apparatus, according to the invention the ventilation apparatus may be detached and exchanged or cleaned. It is further possible, for example for hygienic reasons, in fixed cleaning intervals or in case of maintenance, to exchange the ventilation apparatus whereby it is prevented that bacteria and vermin may permanently accumulate within the ventilation apparatus.

According to a further advantageous embodiment, the opening and/or the ventilation apparatus comprises at least one sealing element using which the connection between the reservoir and the ventilation apparatus may be sealed. By this it is guaranteed that the viscous medium does not leak uncontrolled from the reservoir. At the same time, via the sealing element mounting the ventilation apparatus in the opening may be acquired. This may, for example, be acquired by friction, however, it is also possible that for example a ring seal engages into correspondingly prepared recesses in the opening and in the ventilation apparatus and thus seals the connection and simultaneously cares for mounting the ventilation apparatus to the reservoir.

According to a further advantageous embodiment, the detachable connection may be acquired via a form lock, in particular a snap lock, bayonet lock or screw lock or via a frictional lock, in particular clamps. Apart from the above-mentioned mounting by means of the seal, the ventilation apparatus may also be screwed into the opening, for example by means of a bayonet lock or a screw lock, or may be snapped in. In this respect, for example, the reservoir or the ventilation apparatus may comprise a projection which cooperates with a complementarily implemented groove at the respective other element so that the ventilation apparatus may be snapped in at the reservoir.

Alternatively, also mounting via clamps is possible or via the above-mentioned friction, wherein for example a deformable end piece of the ventilation apparatus is clamped into the opening by exerting force.

According to a further advantageous embodiment, the ventilation apparatus is configured tube-shaped and comprises an air inlet opening and an air outlet opening, wherein the air outlet opening leads to an interior space of the reservoir and the air inlet opening leads to an exterior surrounding. The tube-shaped implementation here enables an especially simple and cost-effective manufacturing of the ventilation apparatus.

It is in particular advantageous when the air inlet opening is arranged below the air outlet opening. This way, the viscous medium, should it enter the ventilation apparatus, would leave the same towards the bottom for gravitational reasons and be guided out of the ventilation apparatus. Apart from that, it is guaranteed by the air outlet opening which is directed downwards that no foreign media may enter the reservoir through the ventilation system.

Further, the ventilation apparatus may include a connecting section extending substantially horizontally and comprising the air outlet opening and a tube section following the connecting section which extends substantially vertically and at whose end which is opposite to the connecting section the air inlet opening is formed.

Such an implementation enables an especially simple configuration of the ventilation apparatus as the detachable connection may easily be formed via the horizontal connecting section while the air supply is secured via the vertical tube section. Simultaneously, however, foreign matter or foreign media may only enter the reservoir with difficulty as the air inlet opening is arranged below the air outlet opening.

In order to guarantee a proper installation of the ventilation apparatus, further a first position securing element may be formed at the reservoir and a second position securing element may be formed at the ventilation apparatus which is formed complementary to the first position securing element and guarantee a predetermined spatial position of the ventilation apparatus at the supply device. This way, assembly errors may be reduced.

A further aspect of the present invention relates to a reservoir for an above-described supply device and to a ventilation apparatus for such a supply device or such a reservoir.

Further advantages and advantageous implementations are defined in the sub-claims, in the description and in the drawings.

In the following, the invention is to be described in more detail with reference to the embodiments illustrated in the Figures. Here, the embodiments are merely exemplary and are not to restrict the scope of the application. The same is defined by the appended claims only.

Figure 2:
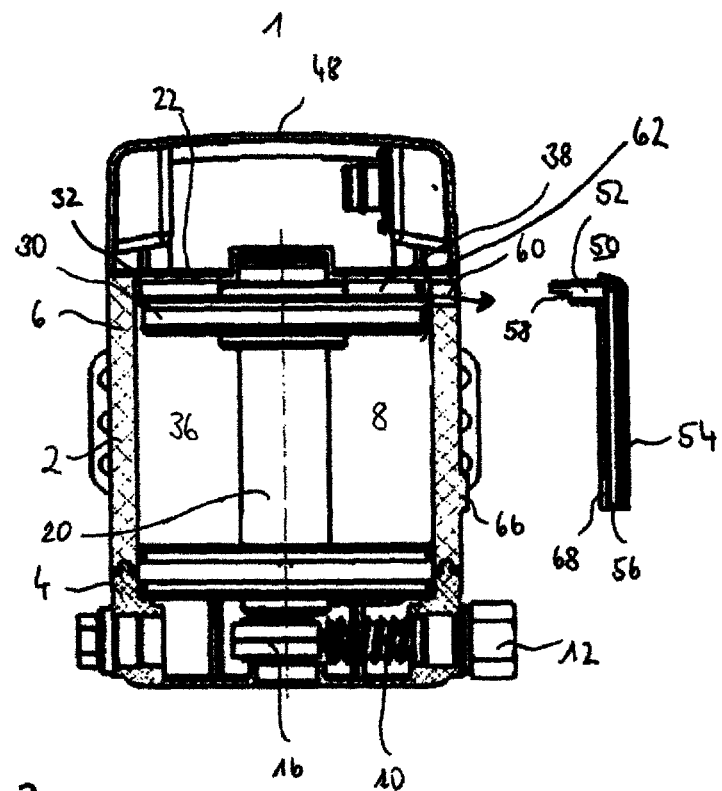
Figure 3:
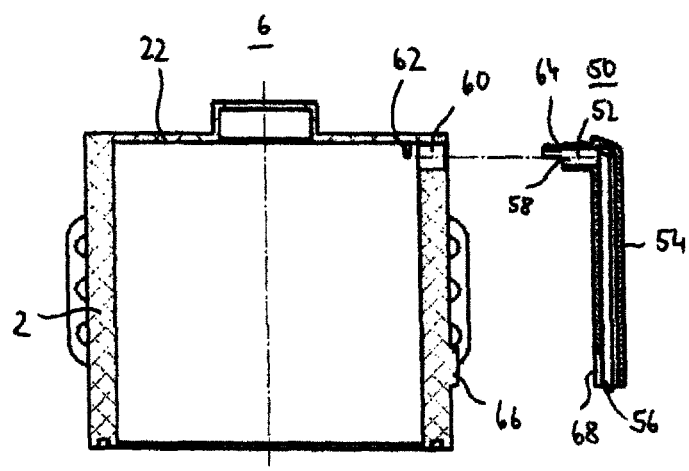

What is illustrated:

FIG. 1: shows a schematic sectional view through an inventive supply device in the form of a lubricant supply device;

FIG. 2: shows a schematic sectional view through the supply device illustrated in FIG. 1 with the ventilation apparatus detached; and FIG. 3: shows a schematic sectional view through a reservoir with a detachable ventilation apparatus.

In the following, like or elements seemingly like regarding their function are designated by the same reference numerals.

The Figures illustrated in the following are sectional views through a lubricant supply device which serves as an exemplary embodiment for a supply device comprising viscous medium. Of course, also other supply devices, for example a water dispenser or soap dispenser may be provided with the described characteristics.

FIG. 1 and FIG. 2 show a schematic sectional view through a lubricant supply device 1 comprising a first housing section 2 and a second housing section 4. Here, the first housing section 2 is implemented as a reservoir 6 for lubricant 8, while the second housing section 4 includes a feed pump 10 by means of which lubricant 8 is fed from the reservoir 6 in the direction of a lubricant outlet 12.

This supply pump 10 is as usual driven by a motor 14, in particular an electric motor which, as is conventionally known, rotates an eccentric 16 which in turn moves a supply piston 18 of the supply pump 10.

In order to provide a lubricant supply device 1 which is especially space-saving, the motor 14 is further arranged in the first housing section 2 forming the reservoir 6. In this respect, in the housing section 2 an interior housing 20 may be provided which receives the motor 14 and extends from a lid side 22 of the housing section 2 to the eccentric 16. Consequently, the interior housing 20 forms a substantially lubricant-free space. On the side facing the eccentric 16 the housing 20 is sealed tight by means of sealing elements 24 at which simultaneously bearings 26 are arranged which care for a transmission of the rotary movement of an axis of rotation 28 of the motor 14 to the eccentric 16.

Further, FIG. 1 shows that in the first housing section 2 a follower piston 30 is arranged which is axially guided by the interior housing 20. The follower piston 30 is basically supported by the lubricant 8 and comprises a ring seal 32 or other sealing elements at its circumferential edges which separate a space 36 supplied with lubricant 8 from an airspace 38.

Further, FIG. 1 shows that between the first housing section 2 and the second housing section 4 an intermediate floor 40 is arranged which comprises one or several openings through which lubricant may be guided from the space 36 in the direction of the feed piston 10 and into the second housing section 4. Below the intermediate floor 40 further a stirring apparatus 42 is arranged which is connected non-rotational to the eccentric 16 and is driven by the motor 14. This stirring apparatus 42 further comprises at least one stirring blade 44 which is implemented in the form of a blade wheel and presses lubricant from the first housing section 2 into the second housing section 4 and from there in the direction of the feed pump 10. Simultaneously, the stirring blade 44 circulates the lubricant in the second housing section 4 so that possibly existing air inclusions in the lubricant are removed. This way, damages in the pump 10 caused by cavitations may be prevented.

Further, FIG. 1 shows that between the intermediate floor 40 and the stirring blade 44 at least one rolling element in the form of a roll 46 is arranged which axially supports the stirring blade 44 against the intermediate floor 40. This way, a higher stability of the stirring blade 44 may be acquired. This is in particular advantageous with cold temperatures or cold lubricant as in this case the movement of the stirring blade 44 may be supported in the direction of the first housing section 2. This movement basically results from the inclination of the stirring blades 44 and the transport of the lubricant in the direction of the feed pump.

Apart from the space-saving arrangement of the motor 14 in the reservoir 6, the arrangement has the further advantage that the motor 14 is in heat-exchanging contact with the interior housing 20 and thus with the lubricant 8. In this way, on the one hand the waste heat of the motor 14 may care for heating up the lubricant 8 and simultaneously the lubricant 8 insulates the motor 14 from excessive temperature fluctuations. This way, in particular with cold temperatures, the motor 14 is better protected. Apart from that, the viscosity of the lubricant 8 may be kept in an optimum temperature range also at low temperatures.

Above the lid area 22 further a housing section 48 may be arranged which includes an electrical controller (not illustrated) for the motor 14 and the piston pump 10.

Further, FIGS. 1 and 2 illustrate that at the first housing section 2 an opening 60 is provided in which a ventilation apparatus 50 is arranged. It may further be gathered from the Figures that from a certain filling state of the reservoir, as illustrated in FIG. 2, the ring seal 32 overruns the opening 60 whereby a fluidic connection between the space 36 supplied with lubricant and the opening 60 and thus with the ventilation element 50 is created. For this reason, air enclosed below the follower piston 30 may escape from the reservoir (see arrow). In case of a maximum filling of the reservoir 6 it may be provided that the follower piston 30 abuts the lid element 22 and the ring seal 32 comes to lie above the opening 60 whereby a maximum air venting from the reservoir 6 is possible. By the fluidic connection between the space 36 filled with lubricant and the opening 60 it may be guaranteed that the space 36 filled with lubricant does not comprise air bubbles which may be sucked into the feed pump 10 and damage the same.

As in case of such a fluidic connection between the space 36 filled with lubricant and the ventilation element 50 an escape of the lubricant from the space 36 filled with lubricant into the ventilation apparatus 50 is possible, it is provided to arrange the ventilation apparatus 50 detachably within the opening 60. In this respect, the ventilation apparatus 50, as it may be gathered from the sectional view of FIG. 2, is implemented detachably, so that it may easily be removed from the reservoir 6 and cleaned or exchanged in case of contamination or in case of maintenance. The ventilation apparatus 50 further comprises a connecting section 52 basically extending horizontally and a tube section 54 basically extending vertically, wherein an air inlet opening 56 provided at the tube section 54 and an air outlet opening provided at the connecting section 52 are formed. This way, on the one hand enclosed air may escape from the space 36 filled with lubricant and on the other hand air may stream into the air space 38 so that the follower piston 30 is not blocked when following the lubricant 8.

One possible detachable connection between ventilation element 50 and opening 60 is illustrated in FIG. 3 which for reasons of simplicity only illustrates the first housing section 2 forming the reservoir and the ventilation apparatus 50 currently detached from the housing section 2. It may further be seen from FIG. 3 that the connecting area 52 of the ventilation apparatus 50 is configured to detachably enter the opening 60. In order to provide a fixation to the reservoir 6 the lid 22 further comprises a stud 62 in the illustrated embodiment which may snap into a complementarily implemented groove 64 at the connecting element 52 of the ventilation apparatus. This way, a detachable but firm connection between the ventilation apparatus 50 and the reservoir 6 may be provided. Here, a length of the stud 62 is selected such that the fluidic connection between the space 36 filled with lubricant and the opening 60 is acquired when the follower piston 30 reaches the stud 62 (see FIG. 2).

It may further be seen in FIGS. 2 and 3 that a projection 66 is arranged at a first housing section 2 which cooperates with a complementarily implemented recess 68 at the ventilation apparatus 50 such that the position of the ventilation apparatus 50 at the reservoir 6 is secured. By this, assembly errors may be prevented.

By the simple tube-shaped implementation of the ventilation apparatus 50 it may further be guaranteed that the same may easily be cleaned. Apart from that, the ventilation apparatus 50 may be manufactured from a plastics material, for example, so that it is also available as a cost-effective exchange element.

Further, the opening 60 and the connecting element 52 may be configured such that the connecting element 52 and/or the ventilation apparatus 50 are sealingly received in the opening 60. For this purpose, for example, corresponding ring seals may be provided.

All in all, it may be guaranteed using the proposed supply device which includes a follower piston that air which accumulates below the follower piston when filling the supply device may escape through the fluidic connection between the space filled with lubricant and the opening so that the feed pump is not damaged by air intake. Apart from that, it may be guaranteed by the removable ventilation apparatus 50 that lubricant which has entered the ventilation apparatus 50 does not lead to the complete reservoir having to be exchanged but that only the ventilation apparatus 50 is cleaned or exchanged. This way, a cost-effective possibility is created to maintain the functioning of the lubricant pump over a long period of time. Simultaneously, by means of the exchangeable ventilation apparatus also strict hygiene requirements may be met. It is possible this way, for example, to exchange the ventilation apparatus 50 in regular intervals so that it is prevented for bacteria or vermin to accumulate permanently in the ventilation apparatus 50.

REFERENCE NUMERAL LIST 1 lubricant supply device
2 first housing section
4 second housing section
6 reservoir
8 lubricant
10 feed pump
12 lubricant outlet
14 motor
16 eccentric
18 feed piston
20 interior housing
22 lid side
24 seal
26 bearing
28 rotational axis
30 follower piston
32 ring seal
36 lubricant receptacle
38 air space
40 intermediate floor
42 stirring device
44 stirring blade
46 roll
48 housing for controlling
50 ventilation apparatus
52 horizontal connector
54 tube piece
56 air inlet opening
58 air outlet opening
60 opening in the first housing section
62 stud
64 groove
66 projection
68 recess

The invention claimed is:
1. A supply device for supplying a consumer with a viscous medium, comprising at least
    a reservoir for the viscous medium comprising a follower piston which comprises a ring seal at its circumferential edges and is resting on the viscous medium and which separates the reservoir into a space supplied with a viscous medium and an air space,
    a feed pump for feeding the viscous medium from the reservoir to a medium outlet, wherein further in the reservoir at least one opening is provided which serves to receive a ventilation apparatus via which the reservoir is in air-exchanging contact with the exterior surroundings;

characterized in that the opening is arranged in the reservoir such that in a determined filling state of the reservoir the ring seal at least partially overrides the opening so that the space supplied with a viscous medium is in fluidic connection with the opening.

2. The supply device according to claim 1, wherein the fluidic connection is formed in case of a maximum filling of the reservoir with a viscous medium.

3. The supply device according to claim 1, wherein the opening is further configured to provide a detachable connection between the reservoir and the ventilation apparatus.

4. The supply device according to claim 1, wherein the opening and/or the ventilation apparatus comprise at least one sealing element by means of which the connection between the reservoir and the ventilation apparatus may be sealed.

5. The supply device according to claim 3, wherein the detachable connection may be selected from the group consisting of a form lock, a snap lock, a bayonet lock, a screw lock, a frictional lock, and clamps.

6. The supply device according to claim 1, wherein the reservoir or the ventilation apparatus comprises a projection which cooperates with a complementarily configured groove at the ventilation apparatus or the reservoir such that the ventilation apparatus may be snapped in at the reservoir.

7. The supply device according to claim 1, wherein the ventilation apparatus is configured tube-shaped and comprises an air inlet opening and an air outlet opening, wherein the air outlet opening leads to an interior space of the reservoir and the air inlet opening leads to an exterior surrounding, wherein the air inlet opening is arranged below the air outlet opening.

8. The supply device according to claim 7, wherein the ventilation apparatus comprises a connecting section comprising the air outlet opening which extends basically horizontally and a tube section following the connecting section which extends basically vertically and at whose end opposite to the connecting section the air inlet opening is formed.

9. The supply device according to claim 1, wherein at the reservoir a first position securing element and at the ventilation apparatus a second position securing element which is complementary to the first position securing element are formed which secure a spatial position of the ventilation apparatus at the supply device.

* * * * *